United States Patent

[11] 3,588,529

[72] Inventors J. Paul Jordan, Jr.;
Robert A. Leightner, Burlington, Vt.
[21] Appl. No. 761,671
[22] Filed Sept. 23, 1968
[45] Patented June 28, 1971
[73] Assignee General Electric Company

[54] CURRENT MODE DIODE FUNCTION GENERATOR
5 Claims, 3 Drawing Figs.

[52] U.S. Cl. .......... 307/229, 307/259, 307/317, 328/144, 328/143
[51] Int. Cl. .......... G06g 7/12
[50] Field of Search .......... 307/229; 328/142, 144

[56] References Cited

UNITED STATES PATENTS

| | | | |
|---|---|---|---|
| 2,567,691 | 9/1951 | Bock et al. | 328/142 |
| 2,581,124 | 1/1952 | Moe | 307/229 |
| 2,810,107 | 10/1957 | Sauber | 328/142 |
| 2,923,876 | 2/1960 | Daspit | 307/229 |
| 3,373,293 | 3/1968 | Hansen et al. | 307/229 |

*Primary Examiner*—Stanley P Miller, Jr.
*Assistant Examiner*—Harold A. Dixon
*Attorneys*—Bailin L. Kuch, Irving M. Freedman, Harry C. Burgess, Frank L. Neuhauser and Oscar B. Waddell

ABSTRACT: An input voltage representing a first variable is transformed into an output voltage representing a second variable or desired function by a circuit including a plurality of slope-changing networks, each of which includes a pair of resistors and a diode. Each diode is normally conducting and effectively removes one resistor of the pair from the circuit. As the input voltage increases, current flow through the resistor pair equalizes at a point determined by their values, thereby making the diode nonconductive and introducing both resistors of the pair into circuit. By appropriate choice of resistor values, the slope-changing networks "switch" in series, thereby producing a corresponding plurality of line segments approximating the desired function.

INVENTORS
J. PAUL JORDAN, JR.
ROBERT A. LEIGHTNER

BY

ATTORNEY

CURRENT MODE DIODE FUNCTION GENERATOR

BACKGROUND OF THE INVENTION

This invention relates to function generators for analog computing systems, and, more particularly, to a diode function generator capable of producing an empirical or arbitrary function $y=f(x)$.

Several types of diode function generators for empirical functions are known to the prior art. The most common of these is illustrated in FIG. 1 wherein the variable $x$ is represented by the voltage $E_i$ and related thereto by a suitable scaling factor, and the function $y=f(x)$ is represented by the voltage $E_o$ and related thereto by another, suitable scaling factor. The diode function generator comprises an input network including a resistance $R_i$ coupled between an input point 2 to which the voltage $E_i$ is connected and an output or summing point 4 at which the voltage $E_o$ is present, and an impedance $R_o$ coupled from summing point 4 to a source of reference potential such as ground. The function generator also comprises a plurality of slope-changing networks, each comprising a resistance and diode in series connection between output or summing point 4 and a suitable biasing voltage source. These slope-changing networks are seen in FIG. 1 to comprise a plurality of resistors $R_1$, $R_2$, $R_3$,—$R_N$ and a plurality of diodes $D_1$, $D_2$, $D_3$,—$D_N$, coupled between summing point 4 and corresponding biasing voltages $e_1$, $e_2$, $e_3$,—$e_N$.

This diode function generator approximates an empirical equation or curve by a series of straight-line segments which are produced by sequentially introducing into the impedance path between points 2 and 4 the varying impedance of the slope-changing networks. In operation, the value of the function $y=f(x)$ at $x=0$, or $f(0)$, may be introduced by coupling a suitable voltage to the input point 2 by means not shown. Thereafter, as the value of $x$ or $E_i$ increases in magnitude, the initial slope of the function is determined by the impedance values of the input network, and in particular by choice of the value of the resistance $R_o$. During this initial operation, the values of the biasing voltages $e_1$ to $e_N$ are chosen such that diodes $D_1$ to $D_N$ are reverse-biased and, therefore, nonconducting.

The length of the initial line segment is determined by the biasing voltage $e_1$. When the input voltage $E_1$ increases to a value where $E_i$ is greater than $e_1$, diode $D_1$ is forward biased and thus conducting. At this point, the impedance presented between terminals 2 and 4 now includes the parallel resistances of impedances $R_o$ and $R_1$. Since the impedance of this parallel combination is less than that of $R_o$, the resultant slope of the second straight-line segment, or the ratio of the output voltage $E_o$ to the change in voltage of the input voltage $E_i$, is less than that of the initial line segment produced by $R_o$.

The duration of this slope, or the length of the second line segment, is determined by the next biasing voltage $e_2$. When the input voltage $E_i$ is greater than $e_2$, diode $D_2$ conducts and the parallel combination of $R_o$ and $R_1$ is replaced in circuit by the parallel combination of $R_o$, $R_1$, and $R_2$. In like manner, the additional impedances $R_3$ through $R_N$ are introduced into circuit at appropriate voltage levels of $E_i$ equaling $e_3$ through $e_N$.

The diode function generator of FIG. 1 operates in a voltage mode, that is, the networks are introduced in circuit when the input voltage $E_i$ is equal to the increasing biasing voltages $e_1$ through $e_N$. Although voltage mode operation permits accurate production of the individual line segment slopes, the inherent nature of the diodes $D_1$ through $D_N$ produces inaccuracies in the exact values of $E_i$, or $x$, at which the particular slope-changing network is introduced into circuit. The difference between $E_o$ and each of the biasing voltages $e_1$ through $e_N$ determines whether or not the associated diode is conducting or nonconducting. When the input voltage $E_i$ equals $e_1$, for instance, diode $D_1$ is just beginning to conduct. At this point, the diode forward voltage drop becomes important, for the diode will not fully conduct until the difference $E_i-e_1$ is greater than the voltage drop. Thus, the exact value of $E_i$ at which the slope-changing networks are introduced in circuit is somewhat dependent upon the forward voltage drop of the diodes. Since these voltage drops may vary widely from diode to diode, even within the same type, and because forward voltage drops are a function of temperature, it is difficult to very accurately generate a function with the circuitry of FIG. 1. Moreover, as the magnitude of the diode voltage drop is often of the same order as that of the input or computation voltage $E_i$, the errors thus introduced are intolerable.

SUMMARY OF THE INVENTION

It is therefore an object of this invention to furnish a diode function generator which is accurately and precisely controllable by varying values of the input variable.

It is a further object of this invention to provide such a diode function generator which approximates a function by a series of line segments, thereby accurately and precisely introducing into circuit a plurality of slope-changing networks.

It is yet a further object of this invention to provide such a diode function generator which is readily adaptable for use with solid-state components and which permits easy computation of both the individual line segment slopes and the individual slope change points.

These objects and others, which will be realized from a consideration of the following specification, are achieved in one embodiment of the invention by providing a plurality of slope-changing networks, each including a diode which operates in a current mode.

DESCRIPTION OF THE DRAWINGS

The subject matter of this invention is particularly pointed out and distinctly claimed in the concluding portion of the specification. The invention both as to organization and method of operation may best be understood by reference to the following description taken in conjunction with the accompanying drawings in which:

DESCRIPTION OF THE PREFERRED EMBODIMENT

Figure 1:
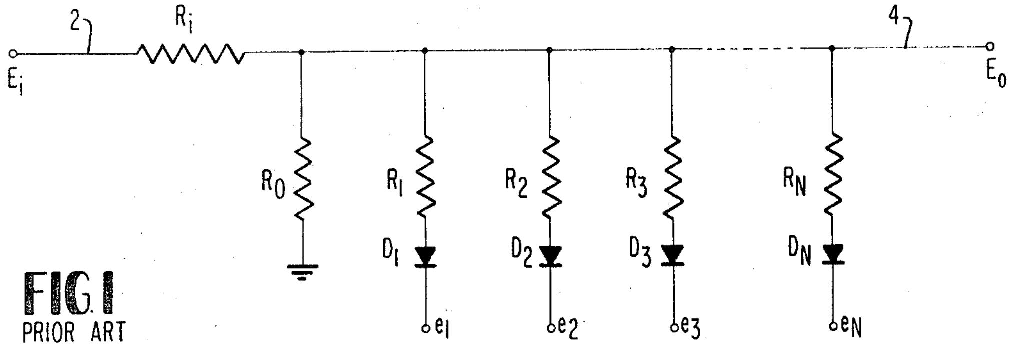
FIG. 1 PRIOR ART
FIG. 1 is a schematic diagram of a prior art function generator previously described.
Figure 2:
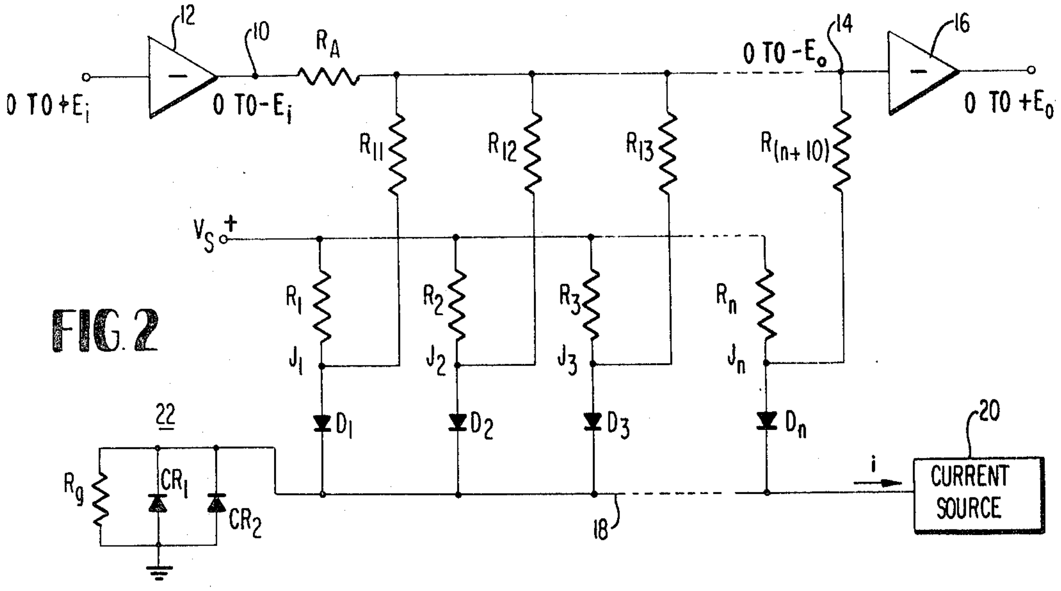
FIG. 2 is a schematic diagram of a diode function generator constructed according to the teachings of this invention.

Now referring to FIG. 2, the input variable voltage $E_i$ is coupled to an input point 10 by means of a logical inverter circuit 12. Input point 10 is connected to an output and summing point 14 by means of an impedance $R_A$. The generated function appears at output point 14 and may be inverted to a positive voltage $E_o$ by a second logical inverter 16. Inverters 12 and 16 may contain amplifying circuits for producing suitable scaling factors useful in computation; however, neither circuit is essential to any practice of the invention.

A plurality of slope-changing networks include resistance $R_{11}$, $R_{12}$, $R_{13}$,—$R_{(n+10)}$, each having one terminal thereof coupled to output of summing point 14. The other terminals of these resistances are coupled through diodes $D_1$, $D_2$, $D_3$,—$D_n$ to a common bus 18.

The common point $J_1$, $J_2$, $J_3$,—$J_N$ of each resistor-diode pair in each slope-changing network is coupled to a voltage source $V_s$ by a plurality of resistors R1, R2, R3,—$R_n$. Finally, a current source 20 is connected to one terminal of bus 18, and a biasing circuit 22 is coupled to the other terminal thereof and comprises the parallel combination of a resistance $R_g$, and diodes $CR_1$ and $CR_2$ coupled from bus 18 to a source of reference potential, such as ground.

In the embodiment illustrated, current source 20 may be any of those well-known circuits which will draw current from the source of reference potential. Therefore, the voltage on bus 18 is normally negative with respect to the reference potential and is hereinafter designated as $-V_g$, being determined by the forward drops of diodes $CR_1$ and $CR_2$ and by the voltage drop across resistance $R_g$. If voltage source $V_s$ is chosen to be positive with respect to the reference potential, then diodes $D_1$ through $D_n$ are normally maintained in a conducting condition.

To reduce any effects upon computational accuracy by the diode forward drops, the value of the voltage at bus 18, or $-V_g$, is chosen to closely approximate the average forward voltage drop across the diodes $D_1$—$D_n$. This average forward voltage drop includes both an ohmic drop due to the resistance of the diodes and their connections and a standoff voltage produced by majority carrier flows through the diodes. The standoff voltage is most sensitive to temperature variation and is accordingly compensated for by the diodes $CR_1$ and $CR_2$ which produce appropriate changes in the voltage $-V_g$ on bus 18. Changes in the ohmic drops are likewise compensated for by diodes $CR_1$ and $CR_2$ and by resistance $R_g$. In this manner, the potential maintained at common points $J_1$ through $J_n$ is nominally reference potential.

For values of $E_i$ equal to reference potential or for various small values thereof, the slope of the initial line segment is determined by impedance between points 10 and 14 comprising resistance $R_A$ in series with the parallel combination of resistors $R_{11}$—$R_{(n+10)}$ connected between point 14 and reference potential.

As the input variable voltage $E_i$ begins to increase from zero to positive values, current flows in proportion from points $J_1$, $J_2$, . . . $J_n$, through the corresponding resistances $R_{11}$—$R_{(n-10)}$ to summing point 14. As the amplifier 12 inverts the input variable voltage $E_1$ to a negative variable voltage at its output terminal, this current originates from the source $V_s$, flowing thru the resistances $R_1$, $R_2$,—$R_n$ to the points $J_1$, $J_2$,—$J_n$, then through $R_{11}$—$R_{(n+10)}$, terminating in the amplifier 12. Current flowing from $V_s$ through $R_1$, $R_2$—$R_n$ also flows through diodes $D_1$, $D_2$—$D_n$ to the current source 20. Because the current source 20 also receives a current from ground through the diodes $CR_1$ and $CR_2$, the bus 18 is maintained at a fixed potential below ground by the amount of voltage across the diodes $CR_1$ and $CR_2$, As long as current flows thru the diodes $D_1$—$D_n$, the respective points $J_1$—$J_n$ are maintained at ground potential by the conducting diode.

When a diode $D_1$—$D_n$ is conducting, its respective resistance $R_1$—$R_n$ has a fixed potential on both terminals and therefore does not contribute to the slope of the input to output function. When a current flowing through resistors $R_{11}$—$R_{(n+10)}$ increases to a magnitude equal to that current drawn from $V_s$ through the associated resistor $R_1$—$R_n$ to $J_1$—$J_n$, the associated diode $D_1$—$D_n$ is no longer in conduction, and the respective resistance $R_1$—$R_n$ contributes to the slope of the input to output function. Here the resistances $R_1$—$R_n$ do not have a fixed potential on both terminals, their current being influenced by the output voltage of the amplifier 12.

The diodes $D_1$—$D_n$ terminate their current conduction at different values of the voltage out of the amplifier 12, and, hence, each diode with its associated resistances forms a slope change point. The initial slope change point may be selected by appropriately choosing the values of $R_1$ and $R_{11}$ so that the current through $R_{11}$ equals that through $R_1$ at a desired value of $E_i$. At this point, the current flowing through diode $D_1$ to bus 18 is not sufficient to maintain that diode in a conducting condition. Thereafter, with increasing values of $E_i$, the slope of the second line segment is determined by the impedance between points 10 and 14. This impedance includes $R_A$ in circuit with the series connection of $R_1$ and $R_{11}$ connected between the voltage source $V_s$ and output point 14, and with the combination of $R_{12}$—$R_{(n+10)}$ connected between output point 14 and reference potential.

Diodes $D_2$—$D_n$ may be likewise placed in a nonconducting condition by appropriate choice of the resistance values of each slope-changing network. Therefore, a series of distinct line segments are produced, each of whose length is controlled by the choice of the turnoff As the amplifier 12 inverts the input variable voltage $E_1$ to a negative variable voltage at its output terminal, this current originates from the source $V_s$, flowing through the resistances $R_1$, $R_2$,...$R_n$ to the points $J_1$, $J_2$,...$J_n$, then through $R_{11}$...$R_{(n+10)}$, terminating in the amplifier 12. Current flowing from $V_s$ through $R_1$, $R_2$...$R_n$ also flows through diodes $D_1$, $D_2$...$D_n$ to the current source 20. Because the current source 20 also receives a current from ground through the diodes $CR_1$ and $CR_2$, the buss 18 is maintained at a fixed potential below ground by the amount of voltage across the diodes $CR_1$ and $CR_2$. As long as current flows thru the diodes $D_1$...$D_n$, the respective points $J_1$...$J_n$ are maintained at ground potential by the conducting diode.

When a diode $D_1$...$D_n$ is conducting, its respective resistance $R_1$...$R_n$ has a fixed potential on both terminals and therefore does not contribute to the slope of the input to output function. When a current flowing through resistors $R_{11}$...$R_{(n+10)}$ increases to a magnitude equal to that current drawn from $V_s$ through the associated resistor $R_1$...$R_n$ to $J_1$...$J_n$, the associated diode $D_1$...$D_n$ is no longer in conduction, and the respective resistance $R_1$...$R_n$ contributes to the slope of the input to output function. Here the resistances $R_1$...$R_n$ do not have a fixed potential on both terminals, their current being influenced by the output voltage of the amplifier 12.

The diodes $D_1$...$D_n$ terminate their current conduction at different values of the voltage out of the amplifier 12, and, hence each diode with its associated resistances forms a slope change point. point of each diode $D_1$—$D_n$ and each of whose slopes is determined by the value of the impedance in circuit between points 10 and 14.

The effects of each diode forward drop is significantly reduced by this circuitry. The average drop is balanced out by biasing circuit 22 including resistor $R_g$ and diodes $CR_1$ and $CR_2$. Any remaining drop due to individual diode variations may be made very small with respect to the computational or input voltage $E_i$. Moreover, by using current balance through the two resistors of each slope-changing network as a means for switching that network, the remaining drop can be still further reduced. As each slope change point is reached, each drop is lessened by the gradual cessation of current flow through the appropriate diode.

The resistance values in the slope-changing networks may be computed by first writing mode equations for the circuit of FIG. 2 and deriving therefrom a set of equations relating the resistor values to the desired function. It should be noted that the diode function generator of this invention permits generation only of curves which are monotonically decreasing, that is, the slope of every succeeding line segment is greater than that of the previous segment. Given this restriction, curves such as those illustrated in FIG. 3 can easily be implemented. If nonmonotonic functions are desired, they can be obtained as the difference of two monotonic functions.

Figure 3:
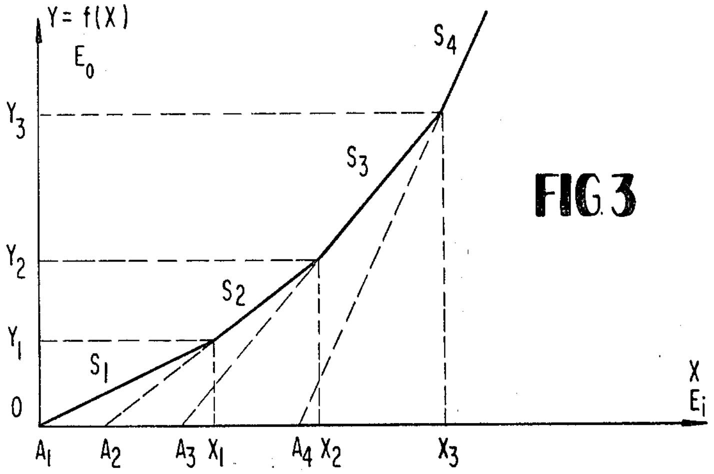
FIG. 3 is a graph of a typical function $y=f(x)$ produced by the generator.

In FIG. 3, $S_1$, $S_2$, $S_3$, and $S_4$ denote the slope and $A_1$, $A_2$, $A_3$ and $A_4$ denote the $x$-intercepts of each succeeding line segment. Then, it is elementary that $$S_n = \frac{Y_n - Y_{(n-1)}}{X_n - X_{(n-1)}}$$

and $$A_n = X_n - \frac{Y_n}{S_n}$$

From the aforementioned node equations, it can be shown that $$R_{(n+10)} = \frac{1}{SIN(n) - SIN(n+1)}$$

and $$R_n = \frac{1}{ST(n) - ST(N-1)} - R_{(n+10)}$$

where $$ST(n) = \frac{A(n+1)}{V_s R_A}$$

and $$SIN(n) = \frac{1}{R_A}\left[\frac{1}{S(n)} - 1 - \frac{A(n)}{V_s}\right]$$

Although these calculations can be performed by hand, they are readily adaptable to computer solution. In addition, the computer program may be designed to calculate errors resulting from an initial choice of resistor values and to accordingly correct those values. By such a technique, a function generator has been constructed in accordance with this invention whose output deviated from a desired function less than 0.1 percent over a temperature range of —45° C. to 65° C.

We claim:

1. A circuit for transforming an input signal present at a first terminal into a function thereof at a second terminal, including:

means coupling the first and second terminals;

a common bus and voltage supply;

a plurality of slope-changing networks, each network comprising a first resistance and a series diode coupling the second terminal and said common bus, and comprising a second resistance connected from the juncture of said first resistance and said diode to said voltage supply; the relative values of the resistances in each network determining the points of slope change;

means connected to said common bus for normally maintaining a fixed potential on said bus, which is less than said supply voltage, and normally maintains said diodes in conduction, each of said diodes being poled for normal conduction from said voltage supply, said networks thereby switching by sequential current balance through said first and second resistances and resultant sequential nonconduction of each of said diodes, with increasing values of the input signal.

2. The circuit as recited in claim 1 wherein said potential-maintaining means comprises:

a source of reference potential;

a biasing circuit connected between said reference-potential source and said common bus;

a current source coupled to said common bus, said current source drawing current through said biasing circuit from said reference-potential source.

3. The circuit recited in claim 2 in which the fixed potential is chosen to equal the average forward voltage drop of said diodes in said slope-changing networks.

4. The circuit as recited in claim 2 wherein the biasing circuit comprises a shunt-connected resistance and diode.

5. The circuit recited in claim 3 in which the fixed potential is chosen to equal the average forward voltage drop of said diodes in said slope-changing networks.